United States Patent Office 3,746,737
Patented July 17, 1973

3,746,737
AMMOXIDATION OF SATURATED HYDROCARBONS
Gerald M. Tullman, Creve Coeur, Mo., assignor to Monsanto Company, St. Louis, Mo.
No Drawing. Filed Feb. 1, 1971, Ser. No. 111,634
Int. Cl. C07c *121/02*
U.S. Cl. 260—465.3      4 Claims

ABSTRACT OF THE DISCLOSURE

Acrylonitrile and methacrylonitrile are prepared in a vapor phase process which comprises reacting propane or isobutane, ammonia and oxygen in the presence of a catalyst consisting essentially of, as the essential catalytic ingredients, cerium and molybdenum, and said metals being present in the form of oxides or of a complex with oxygen or mixtures thereof.

BACKGROUND OF THE INVENTION

This invention relates to the ammoxidation of saturated hydrocarbons to form unsaturated nitriles, particularly alpha, beta-ethylenically unsaturated mono-nitriles.

The value of alpha, beta-unsaturated nitriles is generally well recognized with acrylonitrile being among the most valuable monomers available to the polymer industry for producing useful polymeric products. Acrylonitrile is useful in the preparation of synthetic fibers, synthetic rubbers and other useful plastic products.

Many processes, catalytic and non-catalytic, are known and practiced for the manufacture of alpha, beta-unsaturated nitriles. A generally practiced catalytic ammoxidation process comprises reacting an olefin with ammonia and oxygen in the vapor phase in the presence of a catalyst. For the production of acrylonitrile, propylene is the generally used olefin reactants.

Propane is a source of carbon which is lower in cost than propylene or any other material useful as a starting material in the manufacture of acrylonitrile. Therefore, it is readily recognized that a feasible process for producing acrylonitrile directly from propane would be highly desirable.

Although some art has developed on the ammoxidation of propane to form acrylonitrile, a commercially feasible process has not heretofore been reported because of the ultimate yield of acrylonitrile obtained from propane is relatively low. For example, U.S. Pat. No. 3,365,482 discloses the use of molybdenum oxide or tungsten oxide as catalysts for the conversion of propane to acrylonitrile. However, it is observed from this reference that the ultimate yield of acrylonitrile, based on propane converted, is low. As discussed in this patent and clearly recognized in the art, many catalysts are known which with comparative ease effect the ammoxidation of olefins to form alpha, beta-unsaturated nitriles; but that, unfortunately, saturated hydrocarbons do not have a reactivity comparable to unsaturated hydrocarbons to form alpha, beta-unsaturated nitriles.

SUMMARY

This invention is directed to a vapor phase process wherein at least one saturated hydrocarbon, ammonia and oxygen are contacted in the presence of a catalyst containing cerium and molybdenum under reaction conditions which produce unsaturated nitriles, particularly, at least in part, alpha, beta-ethylenically unsaturated mononitriles. Particularly, this invention is useful in converting propane to acryolnitrile and isobutane to methacrylonitrile.

Accordingly, typical objects of this invention are to provide: (1) an improved vapor phase process for the production of unsaturated nitriles, (2) a vapor phase ammoxidation process for converting saturated hydrocarbons directly to unsaturated nitriles, (3) vapor phase ammoxidation processes for the production of acrylonitrile directly from propane and methacrylonitrile directly from isobutane and, (4) a catalyst useful in the ammoxidation of saturated hydrocarbons.

Other objects, aspects and advantages of this invention will become apparent to those skilled in the art upon further study of this disclosure and the appended claims.

In accordance with this invention, in one aspect, unsaturated nitriles are prepared from saturated hydrocarbons in a one step vapor phase process comprising contacting at least one saturated hydrocarbon, ammonia and oxygen in the presence of a catalyst containing, as the essential catalytic ingredients, cerium and molybdenum under conditions suitable for converting the selected saturated hydrocarbon to the desired unsaturated nitrile.

Any saturated hydrocarbon capable of forming unsaturated nitriles may be used in the practice of the invention. The saturated hydrocarbons may contain 3 to 12 carbon atoms per molecule and may be straight chained or branched.

Basically, the applicable saturated hydrocarbons have up to 12 carbon atoms per molecule and may be represented by the formula:

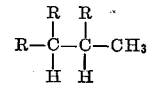

wherein R is hydrogen or a saturated monovalent organic radical. Examples of useful saturated hydrocarbons are propane, butane, isobutane, pentane, isopentane, hexane, isohexane, 3-methyl pentane, dimethylpentane, 2,3-dimethyl butane, heptane, isoheptane, octane, isononane, dodecane, and the like.

One or more saturated hydrocarbons may be employed in the process at any one time. The saturated hydrocarbons employed should be substantially free of unsaturated hydrocarbons for best conversion and optimum yield of the desired unsaturated nitrile. The present invention is, therefore, not to be confused with the developed art directed to olefin ammoxidation processes which unanimously teach that saturated hydrocarbons in the olefin feed are inert to the reaction and apparently serve as a diluent.

While ammonia is most generally employed, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention. The molar ratio of the saturated hydrocarbon:ammonia:oxygen employed in the process of this invention, will generally be in the range of 1:0.5:0.5 to 1:6:8 and preferably in the range of 1:0.8:1.5 to 1:3:4.

The catalyst used in the process of this invention may comprise (i) a mixture of the oxides of cerium and molybdenum and/or (ii) a compound or complex of oxygen, cerium and molybdenum.

The catalysts useful in this invention are based on the elements molybdenum and cerium. The ratios of the elements in the catalysts can vary over wide ranges and may be represented in one aspect by the formula:

wherein z represents a number from about 1 to about 12 and y assumes a particular number depending on the valency states of the other elements (Ce and Mo) and the values of z.

While the catalyst may be employed without any support, it is desirable to combine it with a support. A preferred support is silica. The amount of silica present with the catalyst may vary over a wide range, but it is presently preferred that the catalyst contain between about 25 and 75% by weight of silica. Many other materials such as Alundum, silicon carbide, alumina-silica, alumina, titania and other chemically inert materials may be employed as a support which will withstand the conditions of the process. A presently preferred support is silica having a mean pore diameter of from between about 40 A. and 300 A. and a surface area of from about 150 to about 450 sq. m./gram.

The catalysts useful in this invention can be prepared by any known method of catalyst preparation. Oxides of the catalytic elements can be simply combined. Salts of the catalytic elements can be combined in a solution which is then evaporated to dryness or applied to a suitable carrier and then dried.

The activity of the selected catalyst system is enhanced by heating at an elevated temperature. Preferably the catalyst mixture is dried and heated at a temperature of from about 250 to about 650° C. for from 2 to 24 hours and then calcined at a temperature from about 300 to about 900° C. for from 2 to 8 hours.

In a further aspect, halogens may be employed in the process of this invention. The halogen can be introduced into the reaction in any suitable manner. For example, the halogen may be introduced along with the hydrocarbon, ammonia and oxygen feed as elemental halogen or as a volatile halogenated compound or the catalyst can be treated with or contain the halogen. Any halogen can be used, but at the present bromine is the preferred halogen. Suitable volatile halogenated compounds are, for example; the halo-alkanes, such as mono-, di-, tri- and tetra-, bromo-, chloro-, or iodo methane, ethane, propane, and the like; the halo-alkenes; the halo-alcohols, the halo-ketones, the halo-nitriles and the like. The ammonium halides, hydrogen halides and various metal salts of halogens such as antimony chlorides can be used. When treating the catalyst with the halogen, a metal halide, such as the halides of lead, iron, aluminum, zinc and the like, or a non-metal halide such as an ammonium halide can be used. Generally speaking, regardless of the means of introducing the halogen, the halogen will be employed in a mole ratio of from 0.00005 to 0.10 mole of halogen (measured as $X_2$ where X is fluorine, chlorine, bromine or iodine) per mole of hydrocarbon used.

The process of this invention is carried out as a vapor phase reaction. Accordingly, any apparatus of the type suitable for carrying out oxidation reactions in the vapor phase may be employed for the practice of the process. The process may be operated continuously or intermittently, and may employ a fixed bed with a large particulate or pelleted catalyst, or a so-called "fluidized" bed of catalyst with finely divided catalyst. The latter type is presently preferred for use with the process of this invention as it permits closer control of the temperature of the reaction.

The process of this invention is carried out at a temperature in the range of about 300° C. and up to about 650° C. Preferably, the reaction is conducted at a temperature in the range of about 350 to about 550° C. When ammoxidizing propane to yield acrylonitrile the preferred operating temperature is in the range of 450° C. to 600° C. and when ammoxidizing isobutane to methacrylonitrile such temperature is in the range of 350° C. to 500° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary, depending upon the hydrocarbon being reacted, the catalyst and the reaction temperature. In the case of converting propane to acrylonitrile, the contact time will preferably be within the range of 0.5 to 15 seconds.

The reactor employed may be brought to the desired reaction temperature before or after the introduction of the vapors to be reacted. Preferably, the process is conducted in a manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following examples are given as illustrative of the invention and, as such, specifics presented therein are not intended to be unduly considered limitations upon the scope of this invention.

In the following examples, the reactor used is a concentric tube system fabricated from 96% quartz tubing. The inner tube is ½" by 12" and the outer tube is 1" diameter. The reactor unit is supported in a vertical 1" tube furnace. Heat control of the reactor is accomplished by fluidizing Fisher "sea" sand in the shell side of the reactor unit. The reaction temperatures given in the examples are measured by a thermocouple in the center of the reactor. Prior to entering the reactor, the reactant gases are mixed in standard Swage-lock stainless steel "T's" and introduced into the bottom of the reactor through a coarse quartz fritted tube. The effluent gases from the reactor are chromatographically analyzed.

EXAMPLE I

This example illustrates the preparation of a catalyst useful in this invention.

A first solution is prepared by dissolving 4.80 grams of $(NH_4)_6Mo_7O_{24} \cdot 4H_2O$ in 4.0 cc. of $H_2O$ and 4.0 cc. of 35% $H_2O_2$. A second solution is prepared by dissolving 4.93 grams of $Ce(NO_3)_3 6H_2O$ in 2.4 grams of 65% $HNO_3$ and 6.3 cc. of $H_2O$. The first solution is slowly poured into the second solution. The resulting solution is diluted with 16 cc. of $H_2O$. 18.4 grams of solid commercial catalyst silica gel support having a surface area of 350 m.²/g., a pore volume of 1.70 g./cc., average pore diameter of 200 A. and a mesh size of 54–65 micron is added to the catalyst solution. Thirty-five (35) cc. of $H_2O$ is added to the mixture. The resulting mixture is stirred for 1 hour and then dried for 16 hours at 120° C. and further heated at 550° C. for 8 hours in air.

The resulting catalyst has a chemical composition of about $CeO_2$—8.0%, $MoO_3$—16.1% and $SiO_2$—75.8%.

EXAMPLE II

This example illustrates the conversion of propane directly to acrylonitrile in accordance with this invention.

The feed to the reactor in each run consists of a mixture of propane, ammonia, methyl bromide and air. The volume ratio of propane:ammonia is 1:1.2 and propane:air is 1:12. The variables of reaction temperature and contact times are shown in Table A which also gives the results of the reaction. The catalyst employed is that prepared by Example I.

TABLE A

| Mole percent $CH_3Br$ | Contact time (sec.) | Reactor temp. (° C.) | Propane conversion,[1] percent | Acrylonitrile Single pass yield,[2] percent | Acrylonitrile Ultimate yield,[3] percent |
|---|---|---|---|---|---|
| 0.8 | 5.6 | 516 | 91.5 | 56.1 | 61.3 |
| 0.8 | 5.6 | 518 | 91.5 | 54.5 | 59.6 |
| 1.2 | 5.6 | 500 | 98.0 | 63.8 | 65.1 |
| 1.2 | 5.6 | 498 | 97.9 | 63.0 | 64.4 |
| 1.2 | 5.6 | 482 | 97.9 | 65.2 | 66.6 |

[1] Propane conversion percent
$= \dfrac{\text{Moles propane in feed} - \text{Moles propane in effluent}}{\text{Moles propane in feed}} \times 100$

[2] Acrylonitrile single pass yield percent
$= \dfrac{\text{Moles acrylonitrile in effluent}}{\text{Moles propane in feed}} \times 100$

[3] Acrylonitrile ultimate yield percent
$= \dfrac{\text{Acrylonitrile single pass yield percent}}{\text{Propane conversion percent}} \times 100$

EXAMPLE III

This example illustrates the conversion of propane directly to acrylonitrile in accordance with this invention wherein a halogen is not employed.

Example II is repeated except that the CH₃Br is omitted from the propane, ammonia and air mixture. Acrylonitrile is obtained.

EXAMPLE IV

This example illustrates the conversion of isobutane directly to methacrylonitrile in accordance with this invention.

Example II is repeated except that isobutane is used instead of propane as the hydrocarbon feed. Methacrylonitrile is obtained.

From the above examples it is readily apparent that the catalyst of this invention exhibits an excellent combination of saturated hydrocarbons conversion and unsaturated nitrile selectivity.

It will be obvious to persons skilled in the art that various modifications may be made in the improved catalyst and process as described in this application. Accordingly, it is intended that all such modifications which reasonably fall within the scope of the appended claims are included herein.

We claim:
1. A process for the production of acrylonitrile or methacrylonitrile which comprises reacting in the vapor phase at a temperature from about 300° C. to about 650° C. a mixture of a hydrocarbon selected from the group consisting of propane and isobutane, ammonia and oxygen in a molar ratio of from about 1:0.5:0.5 to about 1:6:8, respectively in the presence of
   (1) a halogen selected from the group consisting of elemental bromine, elemental chlorine, elemental iodine, methyl bromide, methyl chloride and methyl iodide and
   (2) a catalyst based on the elements cerium and molybdenum prepared by forming a solution of salts of the elements molybdenum and cerium, the atomic ratio of cerium:molybdenum being 1:1 to 1:12, impregnating a silica gel support with said solution, drying the resulting mixture and calcining at a temperature from about 300° C. to about 900° C.,
the mole ratio of said halogen to hydrocarbon being from 0.00005 to 0.1 (measured as elemental halogen).

2. The process of claim 1 wherein acrylonitrile is produced, said halogen is methyl bromide, said hydrocarbon is propane and said temperature is about 450° C. to about 600° C.

3. The process of claim 1 wherein methyacrylonitrile is produced, said halogen is methyl bromide, said hydrocarbon is isobutane and said temperature is from about 300° C. to about 500° C.

4. The method of claim 1 wherein said salts of molybdenum and cerium is ammonium molybdate and cerium nitrate respectively.

References Cited

UNITED STATES PATENTS

| 3,118,928 | 1/1964 | Garrison, Jr. | 260—465.3 |
| 3,161,670 | 12/1964 | Adams et al. | 260—465.3 |
| 3,365,482 | 1/1968 | Khoobiar | 260—465.3 |
| 3,433,823 | 3/1969 | McMahon | 260—465.3 |
| 3,226,421 | 12/1965 | Giordano et al. | 260—465.3 |
| 3,262,962 | 7/1966 | McDaniel et al. | 260—465.3 |

FOREIGN PATENTS

| 1,194,855 | 6/1970 | Great Britain | 260—465.3 |

JOSEPH P. BRUST, Primary Examiner